United States Patent [19]

Kreft et al.

[11] Patent Number: 5,648,761

[45] Date of Patent: Jul. 15, 1997

[54] CARD WITH INHIBIT GIVEN REMOTE INTERROGATION

[75] Inventors: Hans-Diedrich Kreft, Dassendorf; Holger Mackenthun, Hamburg; Michael Iloff, Stuttgart, all of Germany

[73] Assignee: Angewandte Digital Elektronik GmbH, Dassendorf, Germany

[21] Appl. No.: 290,374

[22] Filed: Aug. 15, 1994

[30] Foreign Application Priority Data

Aug. 15, 1993 [DE] Germany .................. 43 27 334.3

[51] Int. Cl.$^6$ ............................................. G06F 7/04
[52] U.S. Cl. .............. 340/825.31; 235/380; 340/825.33; 340/825.54; 455/41
[58] Field of Search ............... 340/825.31, 825.33, 340/825.54; 455/41; 235/380, 449, 492

[56] References Cited

U.S. PATENT DOCUMENTS

| | | | |
|---|---|---|---|
| 4,697,183 | 9/1987 | Jenning et al. | |
| 5,070,500 | 12/1991 | Horinouchi et al. | 340/825.54 |
| 5,083,013 | 1/1992 | Levionnais | 235/449 |
| 5,113,184 | 5/1992 | Katayama | 340/825.54 |
| 5,198,647 | 3/1993 | Mizuta | 235/449 |
| 5,349,173 | 9/1994 | Scheckel et al. | 235/492 |
| 5,473,323 | 12/1995 | Kreft | 455/41 |

*Primary Examiner*—Brian Zimmerman
*Assistant Examiner*—Edward Merz
*Attorney, Agent, or Firm*—Hill, Steadman & Simpson

[57] ABSTRACT

Contact-free cards that have at least two coupling elements spatially separated from one another such as, inductor coils, capacitors plates or photoreceivers, that utilize the effects derived from the spatial distance of the coupling elements from one another, i.e. stereo effect, is provided. The contact-free chip cards use the stereo effect to decide whether they are located within a prescribed range of a transmitter receiver. The range of the access can be reduced further, but cannot be increased beyond a fixed limit. Thus, access to the data of such cards outside this range is precluded. Such cards can additionally be equipped with means for switchable authorization of remote access. The contact-free card apparatus of the present invention further provides that it is the card itself and not the card environment that decides whether it is located in the near range of the terminal device such that it allows protectable access to its data and prohibits access from a greater distance.

18 Claims, 7 Drawing Sheets

CARD WITH INHIBIT GIVEN REMOTE INTERROGATION

BACKGROUND OF THE INVENTION

1. Field of the Invention

The present invention is directed generally to chip cards and more specifically to a chip card with the capability of inhibiting remote interrogation of the card.

2. Description of the Related Art

Plastic cards that contain a semiconductor chip (i.e., chip cards, smart cards, intelligent chip cards etc.) are being increasingly utilized in the marketplace. The chips function as data storage devices, microprocessors, input/output modules and much more. They serve purposes such as telephoning, parking, paying for goods and services, conveying credits, controlling access, acquiring time, etc. In their many-faceted embodiments and, in particular, as multi-application cards (cards which are capable of handling a plurality of functions on a single card), these cards allow the storing of personal data. The data on a card provides information about the owner of the card and the card owner's behavior.

Chip cards are mainly known in two technical embodiments, contact cards (voltaic cards) and contact-free (non-voltaic) cards. Contact cards require voltaic contacts at their surface for faultless functioning. Contact-free cards forego these contacts and contain transmission coils, capacitor plates or optical elements for transmitting energy and/or data. The energy required for the operation of the card can be acquired from a battery, particularly a battery located in the card.

There are two embodiments of contact-free chip cards; international standardization is underway for both of these embodiments. Close-coupled cards, for example C2® CARDs, should only be usable over short distances according to ISO 10536. Other cards (remote-coupled cards) work in a different way and can be used over greater distances. The standardization of these remote-coupled cards is still in its infancy. The discrimination between contact-free cards is gaining increasing significance because of the problem of unnoticed access to the card. Table 1 provides a rough overview of the conditions with respect to the usability of the various cards at different distances.

TABLE 1

| Type | Contacted | Contact-Free | |
|---|---|---|---|
| Standard | ISO 7816 | ISO 10536 | No Standard (remote-coupled) |
| Usability | | | |
| close | + | + | + |
| far | − | − | + |

It is virtually impossible when the voltaicly contacted card is used for a means to gain access to the content of the card, without being noticed, as long as the owner has control of the card. However, the conditions are entirely different with contact-free cards. The content of such cards can be accessed without an electrical connection between the card and the terminal device, i.e., wirelessly (contact-free) by definition. Such contact-free cards operate, for example by way of electrical coupling, magnetic coupling, electromagnetic radiation, lightwaves, microwaves, acoustic transmission or combinations of these principles. Thus, the access of the terminal device to the content of the card can be beyond the control of the card owner in these cases. Fundamentally, the terminal device can access the content of the card unnoticed.

Since the data in the remote-coupled card can be accessed both in a terminal device (terminal), as well as from a greater distance outside the terminal, a discrimination between close-coupled chip cards on the one hand and remote-coupled chip cards on the other hand functions properly only when the close-coupled cards necessarily preclude access from a distance.

Contact-free cards contain a chip embedded in the carrier material in a way that cannot be manipulated. Also, contact-free cards have a longer service life than voltaicly contacted cards. Specific embodiments of contact-free cards offer the ergonomic advantage that they can be operated at the terminal without taking into consideration the geometrical orientation of the four different operating positions along the card's longitudinal axis. Most likely the use of the contact-free chip cards will become widespread in addition to that of the voltaic chip card, and advantages will accrue therefrom for the user of the contact-free card.

Card issuers counter the disadvantage of unnoticed access to data of contact-free cards with the argument that their cards allow "remote transmission" only from a limited, small distance. The range is allegedly limited in the manner desired. The counter-argument thereto is that the range can be arbitrarily expanded, within the technologically-possible limits, after an adequate boost of the intensity of the information carrier output by the transmitter. The limits between near operation and remote operation are therefore blurred. The unauthorized manipulation of the card by manipulation at the transmitter cannot be precluded in a documentable fashion. The range of the data traffic is only limited by the intensity of the transmitting medium and can be made arbitrarily great within the scope of feasible technology.

Another argument is that encoding of the data traffic between the card and a specific terminal can protect against unnoticeable access to the data in the card. The counter-argument thereto is that not only does a stolen or simulated terminal likewise meet the function thereof, but that the afore-mentioned boost in intensity can again be used. The encoded data traffic can also occur remotely and the encoding thus has no value as a protective mechanism.

Particular purveyors of products or services—especially banks that accommodate credits or lines of credit on cards of the type under consideration here, have special problems. For instance, such banks can only assume responsibility for the proper condition of the card information content when the card necessarily must be physically inserted into a terminal for processing. The terminal must also be capable of retaining the card when necessary as soon as an error in the processing is found. It is unlikely that such banks will allow a manner of commercial use that cannot irrevocably and non-manipulably provide such a minimum security level.

Thus, a solution is needed for cards which carry out specific functions only within a range predetermined by the card. Then, this solution can also be applied to other problems of non-contacting data transmission, such as, the parameterizing and interrogation, as well as transmission of data to/from contact-free heart pacemakers.

Two possibilities are known for protecting the owner of a contact-free card against unnoticed access to his card data:

the owner of the card is forced to plug his contact-free card into a terminal because the card does not function outside the terminal; and the card user can intentionally and consciously withhold the card from contact-free data transmission by actuating appropriate technical means, i.e. by providing an enveloping shield or operating a switch.

As a result of the latter possibility, the owner of the card not only suppresses the potentially undesired remote access, but also the near access desired in a proper use of the card. No unassailable criterion for distinguishing between near and remote operation exists. For making a card inhibited in this way accessible again for desired, authorized near operation, particularly for intentional incrementing or decrementing of credits in a terminal device, of course, the user must either remove the shield or return the switch to the position to provide a response capability.

This cancellation of the inhibit need not be exclusively manually and intentionally required on the part of the owner; it is also conceivable that the terminal automatically cancels the inhibit with technological means. Whether the inhibit is manually or automatically canceled, protection against remote access, particularly such a remote access by attacking with high intensity is then lost.

In the automatic case, the prior art requires shielding the terminal around the card. This, in fact, leads to a defined distinction between near/remote: near is within the shield and remote is outside the shield. Also, no outside operation can overcome this hurdle no matter how great its intensity. However, the undesirable, physical outlay of shielding the terminal yields a great disadvantage of this solution. Specifically, the quality of the protection is not defined by the card but by its environment. Thus, the card sacrifices control over its data to the environment in which the card is used.

In the manual case, the unprotected time span is substantially lengthened when the owner has the card in his hand outside the terminal device between deactivation and activation of the protection, which is an especially dangerous situation. A mobile shielding around the card that, upon introduction of the card into the terminal device, is subsumed in the afore-mentioned shielding of the latter is equally unreasonable. It should be fundamentally noted that shielding is nothing more than means for attenuating the transmission intensity. More intelligent features are not inherent therein.

SUMMARY OF THE INVENTION

It is an object of the present invention to provide protection against unnoticed access of the data on cards working contact-free wherein the card itself—and not its environment determines, in a way that can be unmistakably reduplicated, whether it is located in the near range (of a terminal device) and only allows protectable access to its data so that the card controls the access.

Another object is to provide a card wherein the contact-free card also only allows certain functions as necessary when it is plugged into a terminal in the same way as a contacted card. To this end, the contract-free card must automatically and necessarily activate or deactivate functions dependent on unambiguously definable physical features that cannot be varied unsupervised (particularly paths, lengths, distances). It should not be possible with such a contact-free card to overcome the access inhibit from an inadmissibly great distance, particularly by increasing the transmission power of the write/read terminal.

Contact-free cards that have at least two coupling elements spatially separated from one another such as, in particular, inductor coils, capacitor plates or photo receivers available to them can meet this demand by using effects that derive from the spatial distance of the coupling elements from one another (particularly known as stereo effect). Contact-free chip cards that use the stereo effect automatically and necessarily decide whether they are located within an invariable, prescribed range of a transmitter/receiver. Given these cards, the range of the access can in fact still be reduced as a result of inadequate intensity but can clearly not be raised beyond fixed limits due to an arbitrarily high intensity of the coupling medium. Access to the data of such cards outside this range can thus be precluded when the exclusion is intended in conformity with the use. When such cards are additionally equipped with a means for switchable authorization of remote access, then these cards can utilize the advantages of contact-free card technology and also avoid their disadvantages.

An embodiment of the present invention provides an apparatus wherein the electronics of a contact-free card automatically recognize whether the card is in a spatial zone whose dimensions are clearly limited by the geometry of the card and not by the intensity of the coupling field.

According to the present invention, a "close-coupled card function" is a card function that can only be utilized in such a limited spatial zone that surrounds the card, the expanse thereof being limited by the dimensions of the card and/or by the expanse or geometrical arrangement of its function-defining component parts and not being capable of being expanded by increasing the field strength to an enlarged spatial zone.

The present invention also provides for a distinction between "close coupling cards" and "remote coupling cards" for use in the international standards,

BRIEF DESCRIPTION OF THE DRAWINGS

FIG. 4b illustrates a more detailed expansion of the block diagram illustrated in FIG. 4a.

DETAILED DESCRIPTION OF THE PREFERRED EMBODIMENTS

Figure 1:
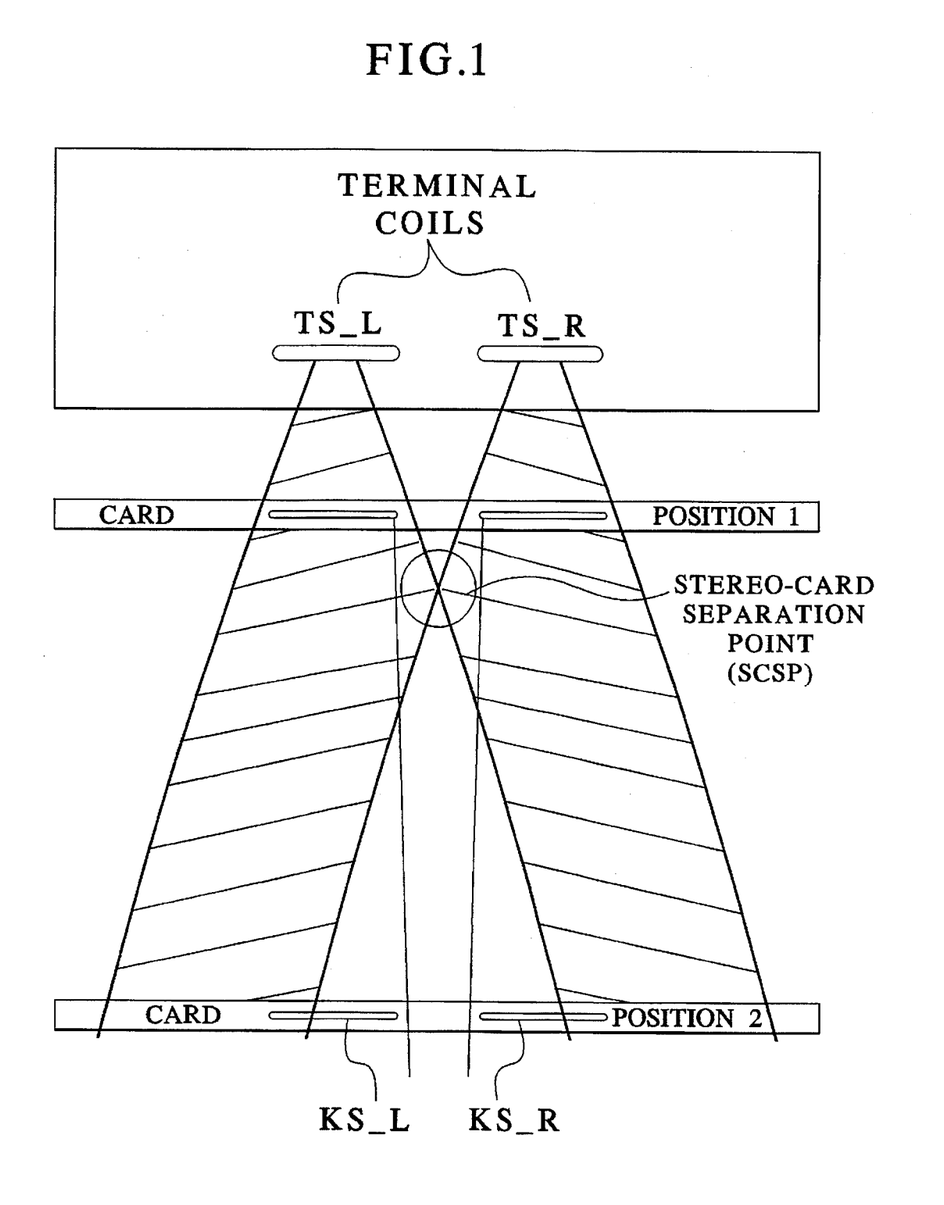
FIG. 1 illustrates "stereo effect" zones of card of the present invention.

FIG. 1 illustrates "stereo effect" zones for a contact-free chip card and a terminal of the present invention. There are two spaces wherein a contact-free card having two coupling elements KS_L and KS_R (denoting, in particular, "left card coil" and "right card coil") according to ISO 10536 can automatically evaluate its distance (quasi by stereo effect) from the corresponding coupling elements of the terminal transmitters TS_L and TS_R (denoting, in particular, "left terminal coil" and "right terminal coil") with especially sharp separation. Due to their special significance, sections through these two spaces are shaded in the figure. These are the stereo-technical zones of the antiphase crosstalk of transmitters having a pronounced directional characteristic onto receivers having a pronounced directional characteristic (dipoles couple onto dipoles). The manner in which these special spaces arise shall be treated in detail later with reference to FIG. 2. Since the distance of the reception elements KS_L and KS_R from one another—referred to here as a stereo base—is invariable in the card, the stereo base defines the greatest range in which the card can document and use the stereo effect.

In an upper card position POSITION 1, both receiver elements KS_L and KS_R are respectively located in a shaded zone. Thus, the stereo effect can take effect. The antiphase crosstalk promotes the channel separation because the corresponding element couples over the short distance without phase angle rotation (TS_L couples directly onto KS_L and TS_R couples directly onto KS_R), whereas the non-corresponding element simultaneously couples crossed with the wrong phase (TS_L couples with the wrong operational sign onto KS_R and TS_R likewise couples with the wrong operational sign onto KS_L). The noise channel (respectively TS_L with reference to KS_R and, correspondingly, TS_R with reference to KS_L) acts subtractively on the useful channel (respectively TS_L with reference to KS_L and, correspondingly, TS_R with respect to KS_R). As a result of the quadrature phase deriving from ISO 10536, each of the two reception elements KS_L and KS_R in this position is best suited for receiving the signal respectively intended for it by TS_L and TS_R with such sharp separation that the following evaluation can generate the desired location information therefrom.

In a lower position POSITION 2, the card is at a greater distance from the transmitter elements TS_L and TS_R. The two reception elements KS_L and KS_R no longer lie in a respectively shaded zone at the same time. Therefore, the stereo effect is greatly decreased. In this case POSITION 2, the figure already shows the centers of the two reception elements KS_L and KS_R in the stereo-technical zone of equiphase crosstalk. The transmission elements TS_L and TS_R now act only additively on the reception elements KS_L and KS_R in terms of a center of gravity—the channel separation disappears, and the stereo transmission has become a monophonic transmission. As a consequence of the afore-mentioned quadrature phase, both reception elements KS_L and KS_R here already carry—by contrast to POSITION 1—nearly exactly the same signal from which, due to the lacking distinguish ability, less location information can be acquired the farther POSITION 2 is located from POSITION 1.

Figure 2:
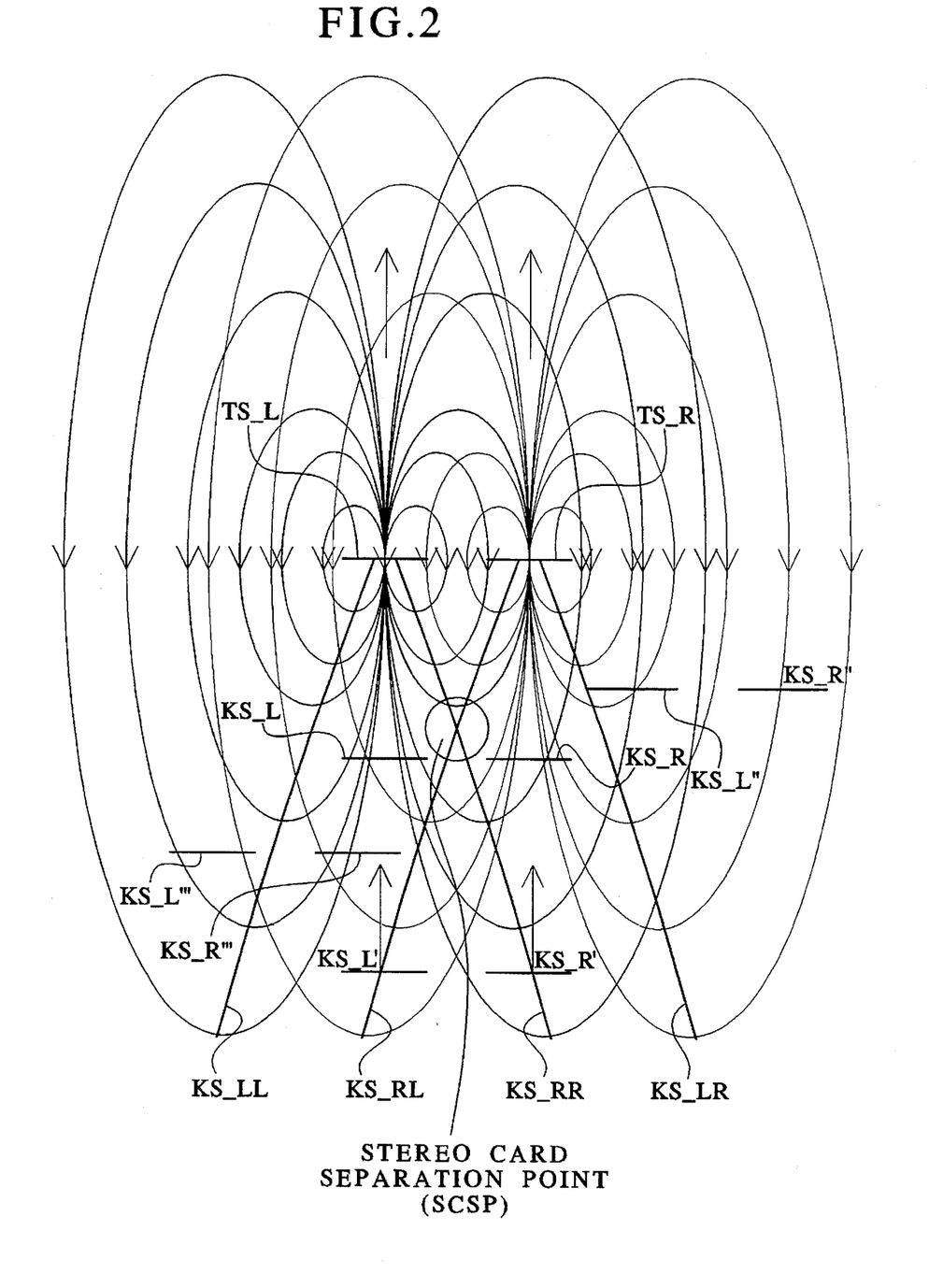
FIG. 2 illustrates flux lines generated in the present invention.

FIG. 2 illustrates the derivation of the shaded zones shown in FIG. 1. The terminal coils TS_L and TS_R are again the transmission elements. Particularly fashioned as dipoles, the terminal coils are not infinitely short like a Hertz dipole and therefore do not supply spherical, but approximately rotation-elliptical flux surfaces, whose sections are qualitatively identified in FIG. 2. In the figure, the two field vectors of the two transmission elements TS_L and TS_R reside parallel perpendicularly parallel relative to one another; they are visibly directed upward, so that the flux in FIG. 2 visibly emerges upwardly from the dipole TS_L and TS_R and in turn penetrates into the respective dipole at the bottom. The flux of TS_L is indicated with medium bold face lines and that of TS_R is indicated with thin lines. For the purpose of further observations, let this arrangement, in particular, be geometrically stationary; only the generated flux is, in particular, an alternating flux.

The card coils KS_L and KS_R, in particular, are likewise magnetic dipoles, but now act not as sources like the terminal coils TS_L and TS_R, but act as sinks. Their two field vectors likewise reside parallel relative to one another and, moreover, likewise particularly reside perpendicularly in the figure and, thus, parallel to the above-described field vectors of the transmission elements TS_L and TS_R. All the coils, TS and KS, are symbolicly shown in the figure as side views of pancake coils. By contrast to the transmission elements TS_L and TS_R, the reception elements KS L and KS_R are not presumed to be stationary. Rather, they can be shifted parallel without rotation of their field vectors in order to be able to study the different system conditions that are of interest. Correspondingly, further illustrated attitudes of card coils are specifically referenced as KS_L' and KS_R', KS_L" and KS_R" as well as, finally, KS_L'" and KS_R'".

An especially interesting aspect of the flux lines are those singularities that supply no contribution to the induction in one or both card coils. Since the field vectors of the card coils KS_L and KS_R were previously assumed to be perpendicular, these singularities regularly occur in the field where the flux lines proceed horizontally. The lower half of these singularities are shown, and the loci of the horizontal tangents at all flux lines of the plane of the drawing are entered with heavy lines. These are the two lines KS_LL and KS_LR that are caused by the transmission element TS_L and the two lines KS_RL and KS_RR that correspondingly derive from the transmission element TS_R. These two line pairs are shown in FIG. 1 as the shaded area limits.

These loci are indispensably used for the demarcation of the local regions having different effects of the transmitted field on the signals induced in the receivers. The upper half of the figure is assumed to be known for symmetry reasons in the following conclusions. It can be easily seen that every imaginable flux line in the figure both to the left of the line KS_LL as well as to the right of the line KS RR proceeds from top to bottom through an arbitrary card coil KS (the case KS_L"/KS R" in FIG. 2). It is defined that the card coils KS are electrically polarized such that the induced voltage is negative in this specific instance. The analysis of the situation close to the center of the figure demands somewhat greater attention because the oppositely directed fluxes can superimpose there. The affected medium is defined as linear, and the result is defined by linear superposition. When an arbitrary card coil KS is located under the lines KS_LL and KS_LR, then the voltage induced therein because of TS_L is positive as a consequence of the above-defined electrical polarization. When, correspondingly, an arbitrary card coil KS is situated under the lines KS_RL and KS_RR, then the voltage induced in it because of TS_R is likewise positive. Correspondingly opposed, the voltage caused by TS_L is negative in a KS above the lines KS_LL and KS_LR and, correspondingly, the voltage caused by TS_R in a KS above the lines KS_RL and KS_RR is likewise negative.

Let the result of the superposition of the individual couplings from the two sources TS to one sink KS be referred to as equiphase or antiphase crosstalk—dependent on the individual flux direction and, consequently, on the induced polarity. When the two fluxes of TS_L and TS_R result in the same polarity of the induced voltage in the respective KS, let this crosstalk be called equiphase. Consequently, the crosstalk must be called antiphase when said two fluxes each induces an opposite polarity. According to this definition, FIG. 2 is to be interpreted in the following way: the shaded zones in FIG. 1 experience antiphase cross talk; all other zones in both figures, however, experience equiphase crosstalk. As mentioned, the upper half in FIG. 2 shall not be separately discussed since it is symmetrical to the lower half.

No crosstalk occurs on the bold face lines in FIG. 2. One of the two emissions of TS_L or TS_R is always clenched thereat. Thus, perfect channel separation prevails. Assuming for the following observations that the stereo base is uniform, let the distance of the two KS from one another be consistent and of the same size as the distance of the two TS from one another. When this arrangement is then displaced along the bold face lines, where these lines respectively proceed parallel to one another, then the afore-mentioned, perfect channel separation takes effect all the way into the induced voltages. Only a single signal from one of the two transmitters TS_L or TS_R appears at the output of each of the two card coils without crosstalk. The farther the reception coil pair KS is shifted away from the transmission coil pair TS along these bold face lines proceeding parallel to one another, the smaller the solid angle that these lines proceeding parallel to one another assumes becomes. The solid angle in which the usable channel separation prevails also becomes smaller in order to derive an authorization for the access to the card contents therefrom.

Thus, it is not possible to gain unauthorized access by exerting adequate intensity from a distance to utilize the channel separation in this solid angle. The attacker must simulate the transmission coil pair TS with the correct stereo base and align one of the two sectors that are shaded in FIG. 1 such that the card is impinged with the adequate channel separation.

In addition, a further impediment for the unauthorized attack is that the attacking transmitter does not know the alignment of the card in space. The deal arrangement of parallel field vectors shown in FIG. 2 for use in file operation will not be accidentally present in noise operation, so that only the projections of the relevant geometrical paths act on the card coil pair KS. The geometry of the noise transmitter and of the attacked card then already fails to coincide with reference to the stereo base. Over and above this, the operation also becomes noise-resistant on these singular parallels when the two signals transmitted by TS_L and TS_R have, in particular, the same frequency, are synchronized phase-locked with one another, carry quadrature phase and, finally, when the binary modulation is a symmetrical quadrature modulation (QM). When, in particular, the sum signal as well as the difference signal of the induced voltages from KS_L and KS_R is then formed in the card, it can be shown that the good channel separation on the singular parallels is not adequate insofar as the card produces the clock of a synchronous detector from the difference signal and allocates the sum signal to the binary modulation. The following occurs as a result. In FIG. 2, the card supplies an unvaried, phase-stable clock from the difference signal and stable quadrature modulation from the sum signal perpendicularly under the transmitters TS_L and TS_R in all positions on and between TS_L and TS_R above KS_L and KS_R at half the height to KS_L' and KS_R' below.

By contrast thereto, sum signals and difference signals are interchanged with one another in the distance on the afore-mentioned, critical parallels. The recovered clock is dependent on the binary modulation and merely has to be electrically discarded because of the accompanying phase shifts. Above the stereo card separation point (this is the interconnection in FIG. 2 of the two lines KS_LR and KS_RL in space, two identical cones intersect in a hyperbola whose apex is this intersection), the clock from the difference signal is stable as in the afore-mentioned useful operation but the binary modulation is complementary to the useful modulation, this representing an unmistakable request to the card to segregate a noise signal. The inversion of the conditions occurs at the level of the stereo card separation point that was just defined: both sum signal as well as the difference signal carry quadrature modulation thereat and can likewise be rejected by the card because of this recognizable defect.

Added thereto is that the signal PHS of FIG. 4 cannot rise above 50% high along the singular parallels being discussed here. It is thus meaningful to select the phase limit value, according to FIG. 4, higher than 50% high in order to combat the simulation of useful operation on the singular parallels.

As set forth above, the conditions given the operating mode particularly elected on a straight line between and in the positions of TS_L/TS_R through KS_L'/KS_R' are unambiguous, significant and stable. This is in contrast to the other positions, in which they are not so at the same time. This lacking proof is unproblematical as a negative proof for the zones under all bold face lines in FIG. 2. There is no difference signal thereat the farther, all the less significant—because both receivers KS_L and KS_R are impinged by the same flux, i.e. no clock. The same is true far enough to the right and left of all parallel lines.

Figure 8:
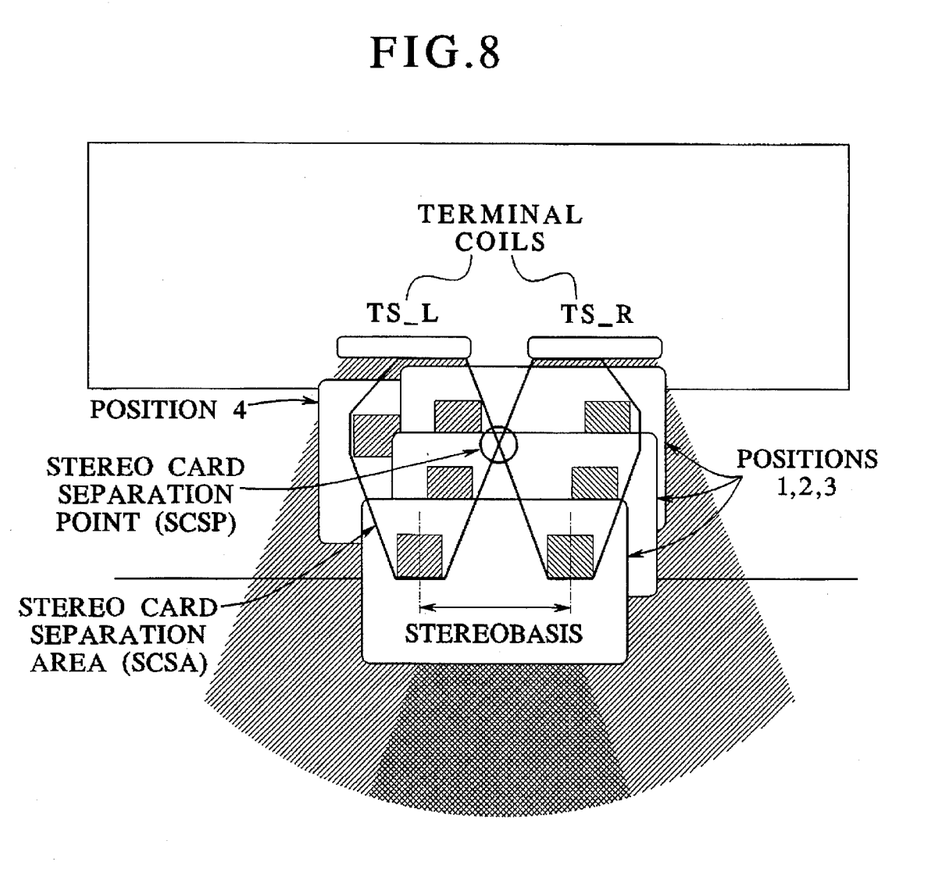
FIG. 8 illustrates positions of a card embodying the present invention in stereo card separation area SCSA of the present invention.

The environment of the singular point is the actual useful zone because—referring to FIG. 8—only there does the antiphase crosstalk lead to phase spread which leads to a phase signal PHS>50% high in FIG. 4. As a result of defining the phase limit value above 50% high, the useful zone, on the one hand, can be made smaller in the direction toward greater reliability and, on the other hand, the signal-to-noise ratio can be improved to prevent undesired attacks from noise regions.

It has already been particularly assumed in the legends to FIG. 2 that the two transmitters TS_L and TS_R transmit with quadrature phase. This idea is initially defined quite specifically only in the time domain in roughly qualitative fashion by FIG. 3. Further supplementary details derive from the vector presentation that follows later. With reference to the periods dimensioned below, TS_L is 45° early and TS_R is 45° late. As known from FIG. 2 in the space domain, no contribution comes from TS_R in position KS_L', i.e. the phase of KS_L' is identical to that of TS_L. Given a qualitative consideration of the superposition while respecting the spacing conditions, KS_L comes earlier than KS_L' because the negative flux of TS_R (definitely 90° earlier than TS_L) is added thereat (antiphase crosstalk). Correspondingly, KS_R comes later than KS_R' because negative flux of TS_L (all together 90° later than TS_R) crosstalks thereat. These two latter chronological curves, however, are not shown in FIG. 3.

It may be seen from FIG. 2 that the time curve nearly coincides with KS_L' in the position KS_R'''. Due to the antiphase cross talk from TS_R, KS_R''' comes somewhat earlier than KS_L', but this is lost in FIG. 3 due to the resolution of the drawing. In position KS_L''', both transmitters TS_L and TS_R couple antiphase; for drafting reasons, however, FIG. 3 leaves the influence of the remote transmitter TS_R out of consideration. In fact, KS_L''' comes somewhat later than shown; in principle, however, one can see in FIG. 3 with reference to the opposite operational signs of the two chronological curves of KS_R''' and KS_L''' that the sum signal disappears and that no good modulation can be acquired according to the manner selected in the legends of FIG. 2.

Figure 3:
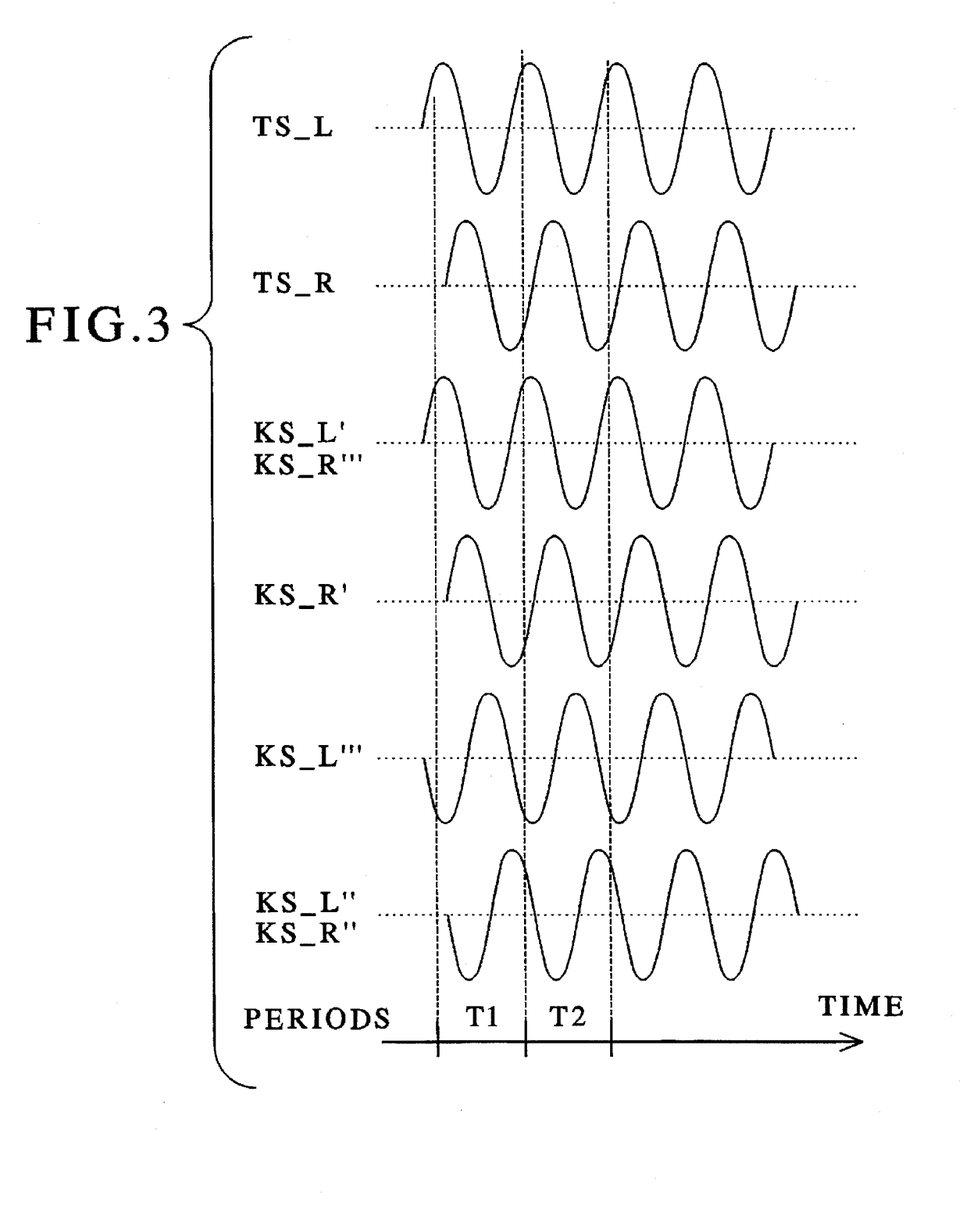
FIG. 3 illustrates a plurality of waveforms of the present invention.

In a comparable way, the chronological curves of KS_L" and KS_R" in FIG. 3 can be derived from FIG. 2. The two transmitters similarly couple KS_L" antiphase onto the two receivers; in terms of the drawing, however, the reversed phase of TS_R dominates here. Together, the two coils do not supply a difference signal, i.e. no clock.

The extensive comments about FIGS. 1, 2 and 3 provide answers from various points of view as to how an embodiment of a card with fixed stereo base according to ISO 10536 and the use of quadrature phase and quadrature modulation can defend against potential attacks on the control of the card owner regarding the data on the card. If an attacker were to manipulate the stereo base of the transmitter by arranging the coils differently in the terminal, then FIG. 2 need not be entirely redrawn. After clarifying the projection of the stereo base that is then effective onto the drawing, only the stereo base of the card KS need be formally reciprocally adapted. The sensitivity of the card to the space domain is then in fact no longer maximal but is still noticeable. When the card is turned within the plane of the drawing of FIG. 2, then the shaded structure in FIG. 1 rotates oppositely. This improves the selection in the preferred space domain. In case of doubt, the card functions with the greatest separation in the environment of the singular point referred to as stereo card separation point (SCSP). All flux components that are vertical in FIG. 2 disappear in the SCSP; when one moves around the SCSP with a reception coil, the alternating flux pointer turns to the same extent (identically directed or oppositely directed dependent on the operational sign of the quadrature phase). In the vector field, this singularity is called rotor (eddy).

When any of the necessary boundary conditions are lacking, then the card either recognizes no clock or no modulation and does not allow any protectable functions in this operating condition but only allows unprotected operating functions—insofar as the intensity-conditioned range (the strength of the magnetic field particularly set forth here decreases with the third power of the distance) and the demodulation process that is less intelligent for unprotected functions allows this.

A chip card system that contains the transmission means symbolically indicated in FIGS. 1, 2 and 3 at TS_L, TS_R, KS_L, KS_R, etc., is the subject matter of U.S. Pat. No. 4,697,183 (incorporated herein by reference). This patent does not recite how it is assured that the card execute only specific functions when it is located in a spatial zone in which the stereo card separation point SCSP lies, a decision regarding near operation (close coupling) being thus established. It is only when the internal electronics of the card carries this out that it is guaranteed that data can only be read out or modified when the card is situated at a distance from the terminal coils as predetermined by the geometry of the coil arrangement in the card relative to the geometry of the coil arrangement in the terminal (i.e., spacings, stereo bases, stereo card separation point).

Figure 4A:
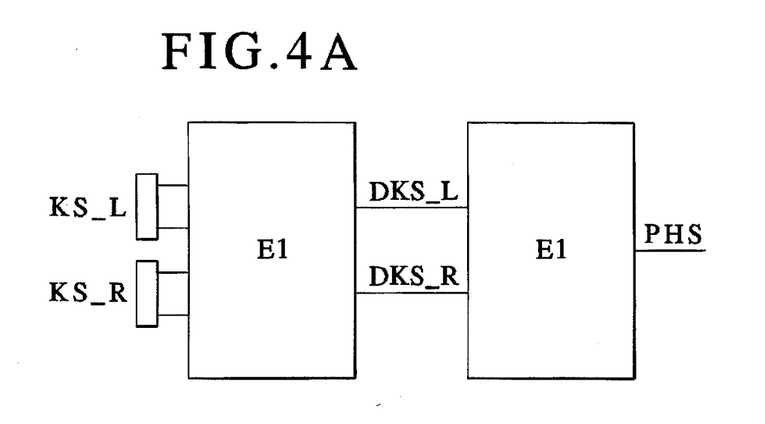
FIG. 4a illustrates a block diagram of the electronics present in an embodiment of the present invention.

FIG. 4a illustrates card coils KS_L and KS_R, which receive the quadrature-phase signals of the terminals TS_L and TS_R, have their outputs applied to a card electronics E1 wherein binary modulated signals DKS_L, DKS_R arise. From these binary modulated signals, electronics E2 generates a signal PHS that, on the basis of its logically true (TRUE) or, respectively, false (FALSE) binary condition, images a phase modulation transported in the signals of the DKS_L and DKS_R that is usable for the operation of the component parts of the card electronics critical to the invention.

Figure 4B:
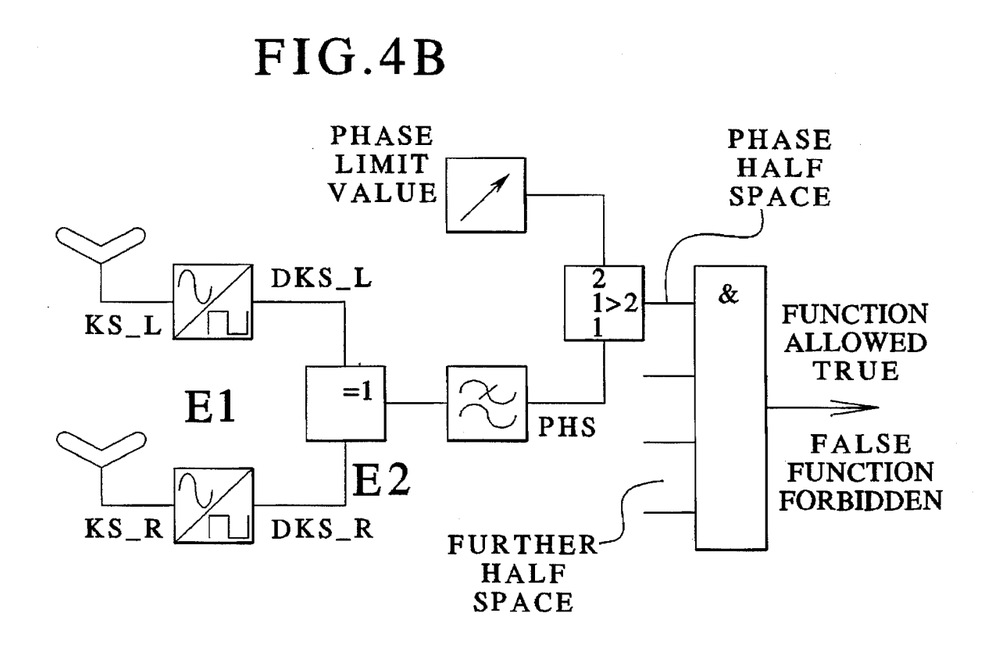

A more detailed block circuit diagram corresponding to FIG. 4a is shown in FIG. 4b and uses standard combination logic elements based on DIN 40700. In particular, the input of a phase limit value generator is additionally shown. In addition, further terminals are reserved for half-spaces that are available.

Figure 5:
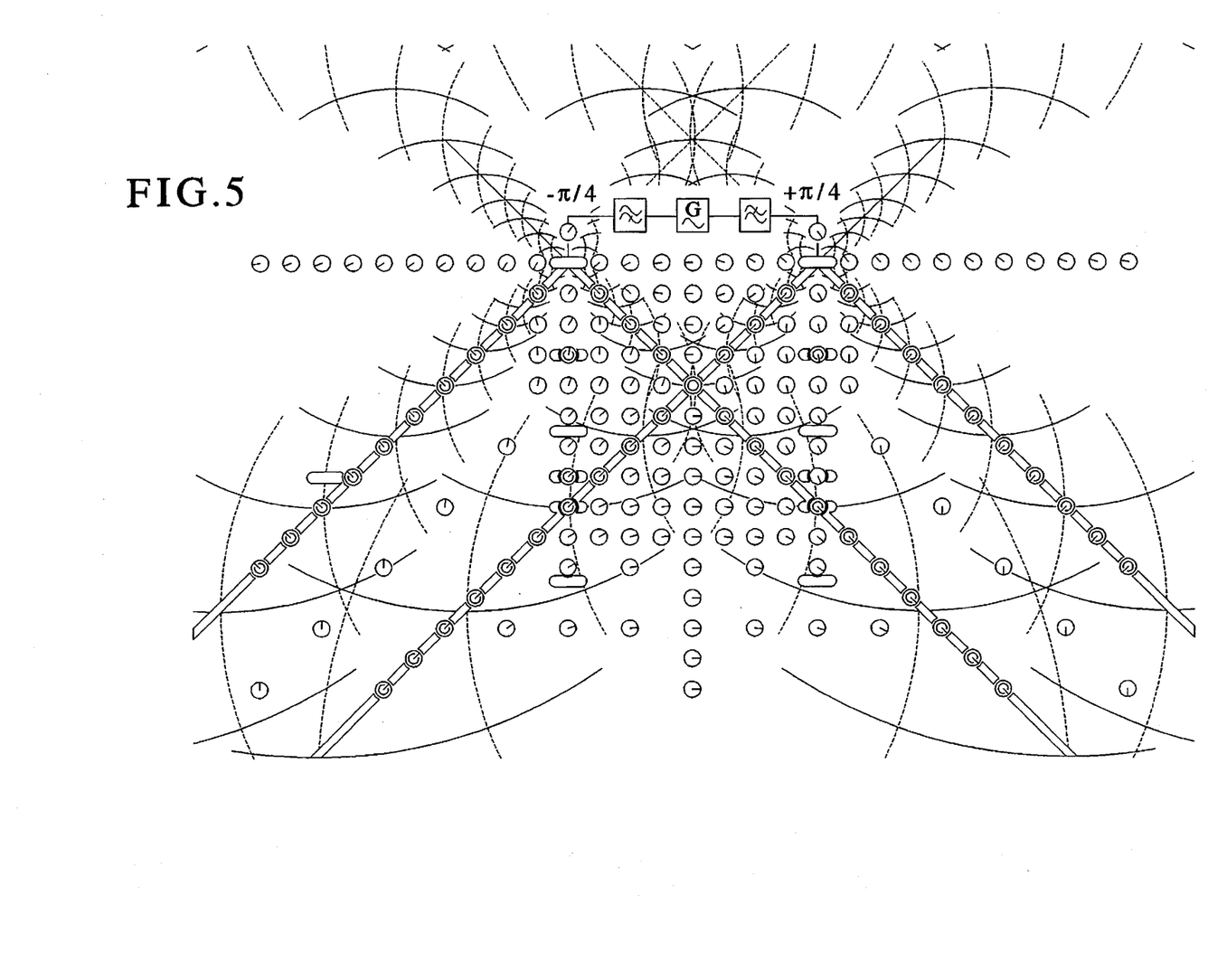
FIG. 5 illustrates flux lines (or the field pattern) and field strength distribution (i.e. lines of force) that result from charging the two transmitters of the present invention with quadrature phase.

FIG. 5 illustrates the consequences of charging the two transmitters TS_L and TS_R with quadrature phase. It is a partially-quantitative development of FIG. 2 and uses like symbols introduced therein. The flux lines are again drawn semi-bold face and also with thin lines. Also, broken-line field strength lines have been added.

First, block circuit symbols show how the phases arise in a known way. A generator generates a sine signal that is oppositely shifted by 45° in two phase shifters. The phase immediately at the output of each phase shifter is respectively unmistakably identified at the left as "$-\pi/4$" at TS_L and, at the right, as "$+\pi/4$" at TS_R.

The illustration of the signal in the phase domain is applied as a AC vector—standard in alternating current theory—as a respectively small symbol immediately on the appertaining feeder to the respective transmitter element. Proceeding therefrom, FIG. 5 shows the spatial response of the AC vectors as a consequence of the addition respectively dependent on phase and magnitude of the two field components but omits the resultant magnitude. Only the phase of the resultant AC vector with the end on a unit circle is shown because the magnitude of the AC vector is not relevant for the system as a result of foregoing the intensity.

When viewing FIG. 5 the AC vectors should not be confused with field vectors. It was already defined in the preconditions regarding FIG. 2 that the field vectors of transmitter and receiver reside parallel to one another and perpendicularly in the figure. Only the vertical components of the location-dependent field vectors induce signals in the receivers. The alternating flux AC vectors of these vertical components are entered location-dependent here in FIG. 5.

Also, FIG. 5 shows the field in the unmodulated condition. In particular, assume the logical status is logical FALSE. Following ISO 10536, the data transmission ensues bit-serially quadrature-phase modulated. It is adequate for this purpose to place the field into the state logical TRUE as needed on the basis of a discrete phase deviation in order to contribute to the transport of logical bits in a way that is otherwise known. The transmitter does this by increasing, in a known manner, the positive phase "$+\pi/4$" to $+3\pi/4$ by the addition of $\pi/2$ and by reducing the negative phase "$-\pi/4$" to $-\pi/4$ by subtraction of $\pi/2$. In FIG. 5 the abstraction of this procedure denotes that the field image is turned by 180° within the plane of the drawing and otherwise continues to act unvaried. The signal PHS does not change stationarily in any way whatsoever due to this type of modulator and the locating method is therefore stationarily independent of the modulator. Transient disturbances due particularly to re-pulsation of energy stores at the change in logic state can be countered by known blanking methods or synchronous detectors, since the possibility of recovery of a clock that is free of phase shift and is location-independent and modulation-independent in the useful zone around the singular point is available for derivation from the difference signal.

Figure 6:
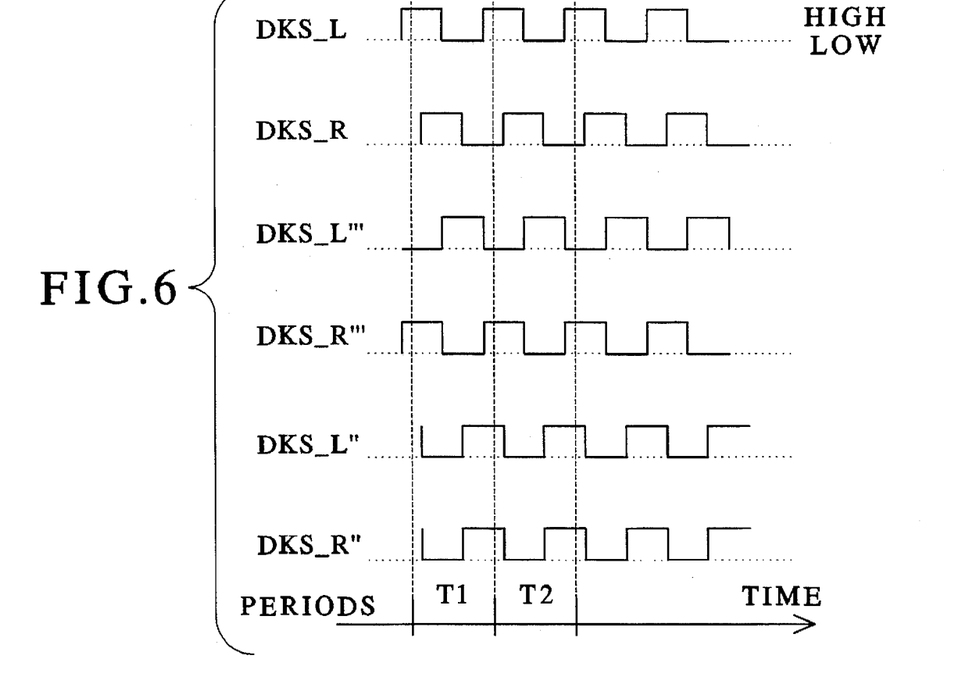
FIG. 6 illustrates signal outputs in the present invention.

The curves of the alternating fluxes of the terminal coils (known as TS_L and TS_R from FIG. 3) in the time domain are shown in FIG. 6 as DKS_L, DKS_R in the upper part. The curves are shown in the way they would appear given perfect channel separation after induction in the card coils KS_L' and KS_R' from FIG. 2, after the clamping of the lower half-wave and after the limitation of the upper half-wave. These binary signals are thus freed from the intensity and now only carry the phase. The quadrature phase may already be seen in the unmodulated condition, which is exclusively shown here. The various phases that are still unmodulated can be considered according to the attitude of the card coils corresponding to FIG. 2 and according to the initially rough interpretation in the legend of FIG. 3.

Figure 7:
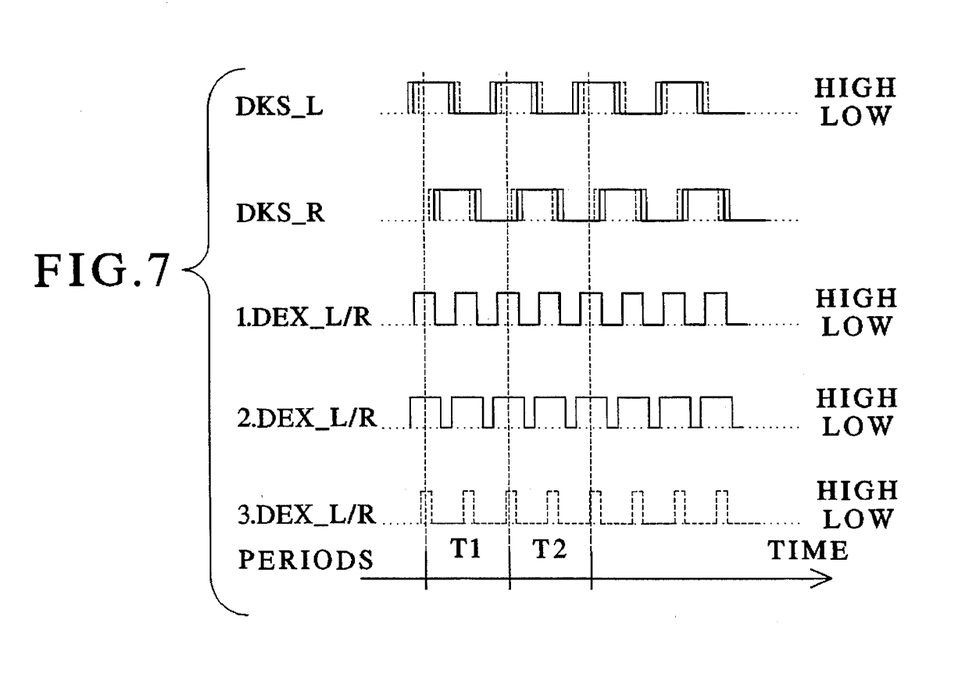
FIG. 7 illustrates signal outputs of the present invention.

In an embodiment, the binary signals DKS_L and DKS_R within E2 of FIG. 4 are operated upon, for example, by an XOR gate in a means known as a phase detector. FIG. 7 illustrates signal curves that result therefrom. The type of signal evaluation is explained below.

The expanse of the stereo card separation area SCSA, wherein the stereo card separation point SCSP is located, is shown in FIG. 8. Dependent on the stereo base and on the generation of a specific signal PHS in conformity with the principles of the present invention, the stereo card separation area SCSA can be defined in terms of its expanse and determines the limits wherein a standardized card according to ISO 10536 can—without additional information about its attitude—separate a close coupling, relative to a transmitter, from a remote coupling. An embodiment of the present invention provides contact-free chip information carriers that contain at least two reception elements (KS_L, KS_R) such as inductor coils, capacitor plates, photoreceivers, microphones or other elements that are spatially separated from one another and are suitable for receiving two differently charged signals, particularly charged with a phase difference.

In one embodiment, the signals from KS_L, KS_R are edited for a second electronics E2 in a first electronics E1 so that a phase difference between these two signals can be electronically interpreted. In particular, the signals KS_L', KS_R' with 90° phase difference are shown in FIG. 3. FIG. 4 represents a block circuit diagram of the electronics units E1, E2 with their inputs and outputs. The signals acquired from KS_L, KS_R and operated upon by E1 are shown in FIG. 6. DKS_L, DKS_R image the phase difference of the signals from KS_L, KS_R. Due to the use of a comparator having a zero threshold, the intensities have disappeared and cannot influence the operation as long as the intensity of both signals KS_L and KS_R is absolutely adequate in order to operate the zero-access crossing comparator disturbance-free (a known squelch circuit can resolve this problem in a known way). Other phase differences occur in FIGS. 4 and 6 due to different spatial relationships between KS_L, KS_R on the one hand and TS_L, TS_R on the other hand, Electronics E2 should react to a discrete phase difference between DKS_L and DKS_R with an unambiguous, discrete signal PHS. Particularly for a phase difference of 90° between DKS_L and DKS_R—in an information-free reference condition, FIG. 7 shows a signal referenced 1.DEX_L/R that results. The 1.DEX_L/R signal has a discrete pulse-duty factor of 1:1. Given a phase difference deviating from 90°, different pulse-duty factors are acquired with 2.DEX_L/R and 3.DEX_L/R. The pulse-duty factor is thus an indication for the phase difference and can be taken as an exemplary embodiment of the signal evaluation within the meaning of the present invention. The level of the output PHS can be acquired from the pulse-duty factor. Given deviation from the pulse-duty factor 1:1 in 1.DEX_L/R, the level PHS can assume a new condition PHS'. To this extent, the exemplary embodiment is equivalent to the known phase detector having an XOR element and a subsequent low-pass filter.

As already proceeds from the descriptions of FIG. 2, an impressed phase difference between TS_L and TS_R is maintained with only limited geometrical conditions relative to TS_L, TS_R and, consequently, can be imaged therefrom. KS_L, KS_R must be located in this geometrical condition, since the received phase difference can otherwise not have the value impressed in TS_L, TS_R. When the intensity in the elements TS_L, TS_R is varied in an arbitrary way, then this has no influence on the limits of the shaded zones in FIG. 1, as was set forth in the description of FIG. 2. When the intensity in both elements TS_L, TS_R is simultaneously varied in terms of size and/or operational sign, then this has no influence on the phase-wise content (spatial response of the phase gradient) of these zones. Only differently constituted variations of the intensity can influence the content of the zones. However, even then the phase fields are only quantitatively distorted within their invariable limits but remain qualitatively employable.

In the present invention, the strength of the transmission power at the elements TS_L, TS_R does not influence the signal, i.e. the stereo base is assumed to be constant. The signal PHS indicates a spatial zone that can be measured in conformity with the present invention and is termed a stereo card separation area SCSA herein. The SCSA acquired in this way enables a separation between close coupling and remote coupling. An element is provided in an embodiment to automatically acquire the SCSA.

As an example, if a video camera were used to record the movements of a card in the proximity of the SCSA and if a registration and memory deposit of the chronological change of the signal PHS were present in the same card, then departure from the SCSA as recorded by the camera could be duplicated from the PHS signal changes registered and stored in the memory in the card.

An embodiment having an integrated signal processor can be selected for the blocks E1 and E2 in FIG. 4. In this case, the language for describing the hardware can be turned over to a compiler, with which the generating technique of the signal PHS, according to all known implementation steps, is located in the ROM of the processor as firmware.

The local zone wherein a transmitted phase difference is recognizable is also defined by the size of the phase difference of the transmitted signals at TS_L, TS_R relative to one another, in addition to being defined by the geometrical conditions. Given antiphase, the field is canceled in the distance. Usable components of the flux are present only in the proximity of the transmitters TS_L and TS_R. Given phase equality, the fields add up in the distance and consequently lead to an arbitrarily great range; however, a phase information for distinguishing between close/remote is not available. These two phase relations are unusable special instances. The alternating flux resulting from the superposition of the two fields generated by TS_L and TS_R always has a scalar AC vector; based on the reception location, it changes only magnitude and/or operational sign. It is binarily rotated. The phase gradient is usually zero in the space domain and, for instance, is infinite only at specific geometrical locations. The infinite gradient for the close/remote discrimination is then only of use when the stereo base of the receiver is only about half as large as that of the transmitter. However, "close" is interchanged with "remote" when the card is turned, i.e. KS_L changes places with KS_R. In both instances, the geometrical locations that are relevant lie within the triangle that is described by the singular point and the two transmitters in FIGS. 1 and 2. This is too close in the equiphase case and far too close in the antiphase case for use in an embodiment of the present invention.

In the case of the quadrature phase on the transmitters TS_L, TS_R, the entire spatial response of the phase gradient is continuous and differentiable because the orthogonal AC vectors of the two fields add up to an analogously rotated AC vector dependent on the local intensity (AC vector magnitude). The local phase gradient can be taken from a receiver KS_L, KS_R and can be processed in the described way to form a signal PHS. This is an optimum embodiment of the subject matter of the present invention. Attacks having phase deviating therefrom for the purpose of fooling the card about its position can only falsify the system status in the direction of the previously discarded phase equality of phase opposition and thus expose themselves to the locating problems that have already been discussed.

The apparatus graphically shown in FIG. 4 shows a preferred embodiment for optimum exploitation of this quadrature phase that was just described above. A comparator compares the analog signal PHS, which is proportional to the local phase, to what is referred to as a phase limit value (likewise analog) in FIG. 4, the latter being set such that it is conformally represented (i.e. mapped) in the locus domain onto the boundary between two half spaces of interest. When the card is located in one half space protectable operations are allowed; they are forbidden in the other half space. The binary signal following the comparator in FIG. 4 consequently states in which of the two half spaces the card is located. Meaningfully, the half space for allowing protectable operations is signaled by the logic condition "true" (TRUE) instead of conversely. As particularly shown in FIG. 4, namely, this signal can then be qualified in an AND element with further restrictions (in particular, further "half spaces", as well as abstract restrictions such as an electromechanical switch, particularly in an extremely simple case).

Further half space signals can be added to the logical qualification of the underlying half space signal in the AND element of FIG. 4 that has just been set forth in order to prevent half space positions that indicate a doubtful position of the card from permitting protectable operations in an optimally reliable way. Only when all of these half space signals simultaneously applied to the AND element are logically true, does the output of the AND element allow the protectable operation. This is the conformal mapping of the section of loci from the space domain onto the conjunction of the binary logic.

A few possibilities of adding space for improving the identification of position are unmodulated transmission with quadrature phase, including a sum signal and a difference signal; and quadrature-modulated transmission with quadrature phase, including a sum signal and a difference signal.

The method described here utilizes the interpretation of a phase difference. The intensity received at the elements KS_L, KS_R can be additionally interpreted—at least redundantly for safeguarding the identification of the receiver position. This intensity is suitable for demarcating the direction of the flux from the elements TS_L, TS_R but does not select a location zone because the received intensity, in addition to being dependent on the spatial origination of the card reception elements KS_L, KS_R with reference to the terminal transmission emits TS_L, TS_R, is also dependent on the intensity of the transmitted signal. Here, too, the absolute intensity of each channel can be fundamentally eliminated in and of itself, for example, by dividing the respective momentary value by an effective value. A usable locus for eliminating ambiguity is, in particular, a hyperbola (in the plane of FIG. 2) acquired by cross-division of the effective values of KS_L, KS_R. An amplitude modulation, however, is not usable because this is already used for the return channel according to ISO 10536.

The drop in field strength with the third power of the distance caused by a greater distance of the card from the transmission means is, basically, a natural limit for the operation. First, the load-modulated return channel according to ISO 10536 fails because the swing produced by the card no longer occurs in the terminal. However, the phase-modulated forward direction from the terminal to the card may still function at greater distances, so that an attacker can blindly impress information on the card from a distance without being worried about the reply from the card. It is particularly this possibility that is suppressed by the the present invention.

In an embodiment of the invention, the principles thereof can be used to control a heart pacemaker. Heart pacemakers can contain primary batteries or secondary batteries that are charged contact-free in order to maintain their function. Such devices should be controllable from the outside contact-free without other fields situated in the space being allowed to influence the function. When the principle of invention is used, functions of heart pacemakers can be controlled contact-free in a close zone, while precluding an influencing from a greater distance.

In an embodiment of the invention, the principle thereof can be used for access control. The remote transmission of data, for example in means of public transportation or in access control, intended by the card user is advantageous since the task of plugging the card in is eliminated. In order to preclude an unwanted interrogation, the remote transmission can be deactivated by actuating a switch (not shown) on the card.

When a card is basically configured for remote coupling (remote coupling beyond ISO 10536), then the momentary capability of the remote coupling can be decided by comparing the signal PHS to the limit value. A comparator handles the comparison in a known way and switches the capability of the remote coupling in the desired way. This switch can be bridged by the signal PHS because the card is then situated in the close region of a terminal. A remote bridging of the switch can be inventively precluded in this way.

When a card has the elements conforming to the invention, then the card can generate a signal PHS upon recognition of a pre-set phase difference that can be used for inhibiting or enabling card functions and which thus only enables the use of specific card functions when the card is located in a predetermined proximity relative to a terminal. The corresponding location area is defined by the geometrical arrangement of the reception elements not by the intensity of the surrounding field. The limit value to be set in the card can be set to conditions of the terminal.

It is conceivable that, despite the known disadvantages, a card for remote transmission has an on/off switch on the card for the purpose of manual operation. The function of this switch can be connected to the signal PHS on the basis of a combination. For example, the function of the switch can be modified given the presence of the card in the stereo card separation area.

Although other modifications and changes may be suggested by those skilled in the art, it is the intention of the inventors to embody within the patent warranted hereon all changes and modifications as reasonably and properly come within the scope of their contribution to the art.

We claim:

1. A method of selectively accessing information in a data card comprising the steps of:
    transmitting first and second signals from corresponding first and second transmitter elements of a terminal;
    generating first and second received signals at corresponding first and second reception elements on a data card;
    determining a distance between the card and the terminal based on a phase difference of said first and second received signals; and
    selectively accessing information in the data card based on a result of said step of determining a distance.

2. The method of claim 1, wherein said step of selectively accessing comprises a step of authorizing access to information contained in the card if the card is located within a defined range.

3. The method of claim 1, wherein said step of selectively accessing comprises a step of denying access to information contained in the card if the card is not located within a defined range.

4. The method of claim 1, wherein the step of transmitting first and second signals comprises transmitting the first and second signals with a quadrature phase difference.

5. A microelectronic contact-free chip card apparatus for use with a terminal having at least a first and a second transmitter element, said apparatus comprising:
    at least a first and a second reception element, spatially separated from each other on a card, said first and second reception elements further comprising:
    a first electronic means for processing an alternating field at said first and second reception elements to provide a first and a second output signal, respectively, said first and second reception elements having a phase shift therebetween that is positively imaged in said first and second output signals, respectively;
    a second electronic means for reacting to a constant, preset phase shift between said first and second output signals without evaluating a received intensity content thereof, to provide an output level at a signal output of said second electronic means, said output level indicating and defining a specific space area adjacent to said first and second transmission elements in which said first and second reception elements are located, said indicated specific space area not being varied in size as a result of a variation of a transmission strength of said first and second transmission elements when a constant phase difference exists between said first and second transmission elements, and when a deviation from said constant phase difference exists, said output level is modified, so that said output level at said signal output of said second electronic means can be used to activate or deactivate specific functions on said card dependent upon a position of said first and second reception elements in said indicated specific space area.

6. The apparatus according to claim 5, wherein said phase difference between said first and second output signals and said output level at said signal output of said second electronic means is provided at various locations from a plurality of alternating field sources such that said field sources have different phases from one another, said field sources providing a plurality of alternating fields superimposing in a space surrounding said card to cause different resultant phase gradients depending on location.

7. The apparatus according to claim 6, wherein phase differences between said plurality of alternating field sources are selected such that a phase gradient of said chip card apparatus available at a location allows an optimally unambiguous locus with reference to positions of said plurality of field sources to be signaled.

8. The apparatus according to claim 7, further comprising means for reducing an ambiguity of said locus by providing at least one further different locus, said further different locus intersecting with said initial locus to become a new locus having a small expanse.

9. The apparatus according to claim 8, further comprising means for adding a locus due to a different modulating of the phase of said plurality of field sources.

10. The apparatus according to claim 9, wherein said means for adding a locus is a means for adding a further locus by evaluating the intensity differences between the plurality of alternating fields from said plurality of field sources arriving in said chip card apparatus that can be distinguished on the basis of different modulation.

11. The apparatus according to claim 6, wherein a system status to be changed is an access authorization for a source dyad to protectable data within said chip card apparatus.

12. The apparatus according to claim 6, wherein a system status to be changed is access authorization for a source dyad to protectable operations within said chip card apparatus.

13. The apparatus according to claim 3, further comprising means for energy-dependent operating modes for providing energy without an external energy supply from said plurality of field sources so that energy required for operation is taken from an internal energy storage device.

14. The apparatus according to claim 5, further comprising a means for adjusting a limit value during operation in an arbitrary direction by operation with stronger access rights.

15. The apparatus according to claim 5, further comprising means for adjusting a limit value during operation such that said limit value can be adjusted by operation with weaker access rights only in such a direction that the access to protectable data or protectable operations requires stronger access rights as a result.

16. The apparatus according to claim 6, wherein said output level has such an operational sign that a greater geometrical distance of said chip card apparatus from a center of gravity of a source dyad causes attenuation of the access rights.

17. The apparatus according to claim 14, wherein said means for adjusting a limit value provides a permanently set limit value of such a size that close coupling is not possible outside the retention range of a terminal.

18. The apparatus according to claim 6, further comprising a mechanically manually actuatable switch combined with said output level to activate or deactivate function elements of such chip card apparatus.

* * * * *